(12) United States Patent
Rudaitis et al.

(10) Patent No.: US 10,408,379 B2
(45) Date of Patent: Sep. 10, 2019

(54) TEMPORARY HANGER SYSTEM FOR VALVE BANKS

(71) Applicant: Parker-Hannifin Corporation, Cleveland, OH (US)

(72) Inventors: Erick Rudaitis, Sterling Heights, MI (US); Craig Hoyt, Galesburg, MI (US); Joshua Kidder, Portage, MI (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/008,517

(22) Filed: Jun. 14, 2018

(65) Prior Publication Data

US 2018/0363840 A1 Dec. 20, 2018

Related U.S. Application Data

(60) Provisional application No. 62/521,619, filed on Jun. 19, 2017.

(51) Int. Cl.
*F16K 27/00* (2006.01)
*F16M 13/02* (2006.01)
(Continued)

(52) U.S. Cl.
CPC .............. *F16M 13/02* (2013.01); *F16K 27/00* (2013.01); *F16M 13/005* (2013.01); *A47B 96/06* (2013.01)

(58) Field of Classification Search
USPC ............ 248/220.42, 220.43, 221.12, 222.41, 248/225.11, 224.8, 223.21, 220.31;
(Continued)

(56) References Cited

U.S. PATENT DOCUMENTS 3,450,427 A 6/1969 Fischer
3,986,318 A * 10/1976 McConnell ............. F16B 12/34
403/384
(Continued)

FOREIGN PATENT DOCUMENTS

CN 104533477 4/2015

OTHER PUBLICATIONS

Xiamen Tongchengjianhui Industry & Trade Co., Ltd. TCJH Keyhole Bracket, Model No. Tcjh-185; https://www.alibaba.com/product-detail/keyhole-bracket_60624716461.html.

*Primary Examiner* — Alfred J Wujciak
(74) *Attorney, Agent, or Firm* — Renner, Otto, Boisselle & Sklar, LLP

(57) ABSTRACT

A hanger system for temporarily hanging a valve bank on a vertical mounting face of a substrate. The hanger system includes one or more hanger brackets for attaching to the vertical mounting face. The valve bank has one or more mounting studs protruding from an underside surface of the valve bank, in which the mounting studs are configured to couple with the hanger brackets for temporarily hanging the valve bank on the mounting face with the underside surface facing toward the mounting face. The mounting studs and hanger brackets are configured to cooperate with each other to allow the valve bank to be secured in multiple different orientations against the mounting face, thereby facilitating fixedly mounting the valve bank to the mounting face with one or more fasteners that are received through corresponding fastening receivers in the valve bank.

18 Claims, 9 Drawing Sheets

(51) Int. Cl.
*F16M 13/00* (2006.01)
*A47B 96/06* (2006.01)

(58) Field of Classification Search
USPC ............... 251/143; 137/15.01, 15.18, 315.01
See application file for complete search history.

(56) References Cited

U.S. PATENT DOCUMENTS

| | | | | |
|---|---|---|---|---|
| 4,460,147 | A | * | 7/1984 | Macbain ................. F16B 12/22 248/222.41 |
| 4,473,316 | A | * | 9/1984 | Welch ..................... F16B 12/22 248/222.41 |
| 4,558,839 | A | * | 12/1985 | Kaplan ................. F16M 13/02 248/221.12 |
| 5,730,409 | A | | 3/1998 | Baron et al. |
| 6,109,819 | A | * | 8/2000 | Welch .................. A47B 13/003 248/222.41 |
| 7,004,199 | B1 | | 2/2006 | Funes et al. |
| 8,235,350 | B2 | | 8/2012 | Tetsuda et al. |
| 10,072,873 | B1 | * | 9/2018 | Ostera ....................... F24H 9/06 |

* cited by examiner

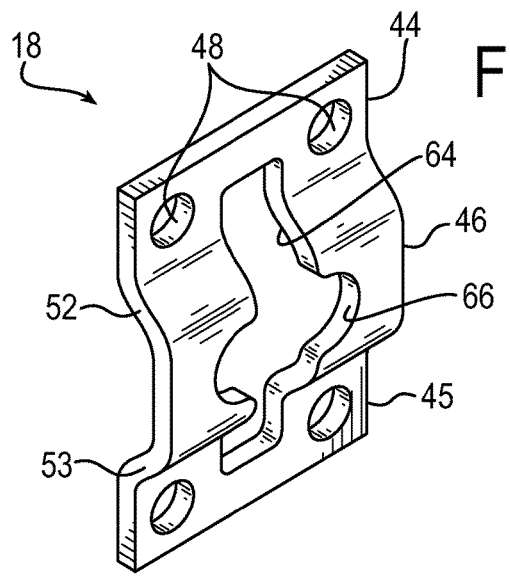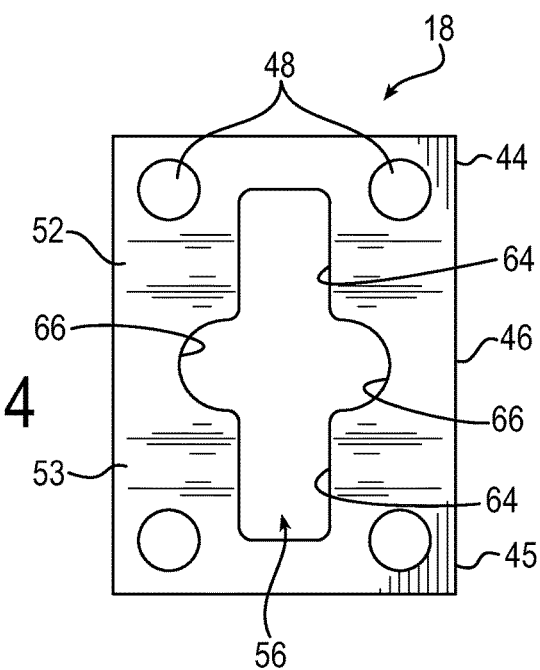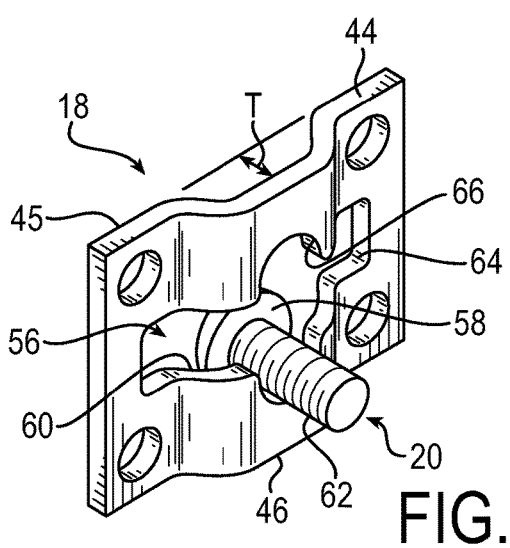

TEMPORARY HANGER SYSTEM FOR VALVE BANKS

RELATED APPLICATIONS

This application claims the benefit of U.S. Provisional Application No. 62/521,619 filed Jun. 19, 2017, which is hereby incorporated herein by reference in its entirety.

FIELD OF INVENTION

The present disclosure relates generally to valve banks, such as for hydraulic or pneumatic control, and more particularly to a hanger system for facilitating mounting of a valve bank to a vertical mounting face.

BACKGROUND

Control valves are commonly used to control one or more actuators or other movable members in a hydraulic or pneumatic system, such as for use in operating machinery in a factory, for example. Each movable member in the system is typically controlled by the movement of a valve member, such as a spool, that moves within a valve body to permit, restrict and/or control the flow of the working fluid through different fluid passages in the valve body, thereby controlling the movement of the actuator or other movable member. A valve bank is an assembly of such control device(s), which may include a single control valve to operate a single movable member, or which may include a plurality of control valves to operate a plurality of movable members.

Such valve banks are often mounted onto equipment or workstations on a factory floor to control the nearby pneumatic or hydraulically operated machines. However, such valve banks are often relatively heavy, sometimes weighing more than 50 lbs. This makes the mounting of these valve banks difficult, especially when the valve bank is mounted to a panel or other substrate that is oriented vertically. As such, the mounting of such valve banks may require more than one person to hold the valve bank in position, drilling mounting holes into the panel at positions that correspond with fastening receivers of the valve bank, and fixedly fasten the valve bank to the panel with fasteners received into the fastening receivers and mounting holes.

Currently, the use of DIN rails is employed to assist in temporarily holding such valve banks to the panel or similar substrate so that the installer can drill the mounting holes and fixedly mount the valve bank to the panel in the manner described above. The DIN rail typically includes a long metal strip that is attached to the panel with fasteners. The long metal strip of the DIN rail will usually have a U-shaped or C-shaped cross-section that forms a channel. The valve bank usually has a corresponding interface, such as an elongated ridge and groove, that is adapted to slide into the channel through an end of the DIN rail, thereby securing the valve bank to the DIN rail so that the valve bank can then be fixedly mounted to the panel. The problem with such current DIN rail designs, however, is that they do not restrict slidable movement of the valve bank along the rail, and thus they will not prevent the valve bank from sliding off the rail when the valve bank and DIN rail are oriented vertically (i.e., pointing toward the ground).

SUMMARY OF INVENTION

The present invention provides a hanger system for temporarily hanging a valve bank on a vertical mounting face of a substrate, in which the hanger system enables the valve bank to be secured in multiple different orientations against the vertical mounting face prior to being fixedly mounted to the mounting face.

According to one aspect of the invention, a hanger system for temporarily hanging a valve bank on a substrate having a mounting face that is oriented vertically relative to ground includes: a hanger bracket for attaching to the mounting face; and a valve bank having a mounting stud protruding from an underside surface of the valve bank, the mounting stud being configured to couple with the hanger bracket for temporarily hanging the valve bank on the mounting face with the underside surface facing toward the mounting face, and the valve bank having a fastening receiver for receiving a fastener that fixedly mounts the valve bank to the mounting face; wherein the mounting stud and the hanger bracket are configured to cooperate with each other to allow the valve bank to be secured in multiple different orientations against the mounting face prior to being fixedly mounted with the fastener; and wherein the mounting stud and the hanger bracket are configured to cooperate with each other to suspend the valve bank on the mounting face, thereby facilitating fixedly mounting the valve bank to the mounting face with the fastener via the fastening receiver.

According to another aspect of the invention, a hanger system for temporarily hanging a pneumatic valve bank on a substrate having a mounting face that is oriented vertically relative to ground includes: a hanger bracket for attaching to the mounting face; and a pneumatic valve bank including a plurality of valve sections, in which at least one valve section is a pneumatic control valve and at least one valve section is an air supply module, the valve bank having a mounting stud protruding from an underside surface of the valve bank, the mounting stud being configured to couple with the hanger bracket for temporarily hanging the valve bank on the mounting face with the underside surface facing toward the mounting face, and the valve bank having a fastening receiver for receiving a fastener that fixedly mounts the valve bank to the mounting face; wherein the mounting stud and the hanger bracket are configured to cooperate with each other to allow the valve bank to be secured in multiple different orientations against the mounting face prior to being fixedly mounted with the fastener, and are configured to cooperate with each other to suspend the valve bank on the mounting face, thereby facilitating fixedly mounting the valve bank to the mounting face with the fastener via the fastening receiver; wherein the mounting stud is disposed in a recessed area on an underside of the valve bank, and the hanger bracket is configured to be received within the recessed area to couple with the mounting stud; and wherein the recessed portion on the underside of the valve bank is on the underside of the air supply module.

According to another aspect of the invention, a method of fixedly mounting a valve bank to a mounting face of a substrate that is oriented vertically relative to ground includes: (i) attaching two discrete hanger brackets to the mounting face; (ii) hanging a valve bank on the hanger brackets with two discrete mounting studs that protrude from an underside surface of the valve bank, such that each of the hanger brackets grips a corresponding one of the mounting studs; and (iii) fixedly mounting the valve bank to the mounting face with fasteners that are received by fastening receivers on the valve bank.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 3 is a perspective view of an exemplary hanger bracket of the hanger system in FIG. 1.

FIG. 4 is a front plan view of the hanger bracket.

FIG. 5 is a perspective view of an exemplary mounting stud of the valve bank that is shown coupling with the hanger bracket when the valve bank is mounted in the exemplary vertical orientation.

DETAILED DESCRIPTION

Figure 1:
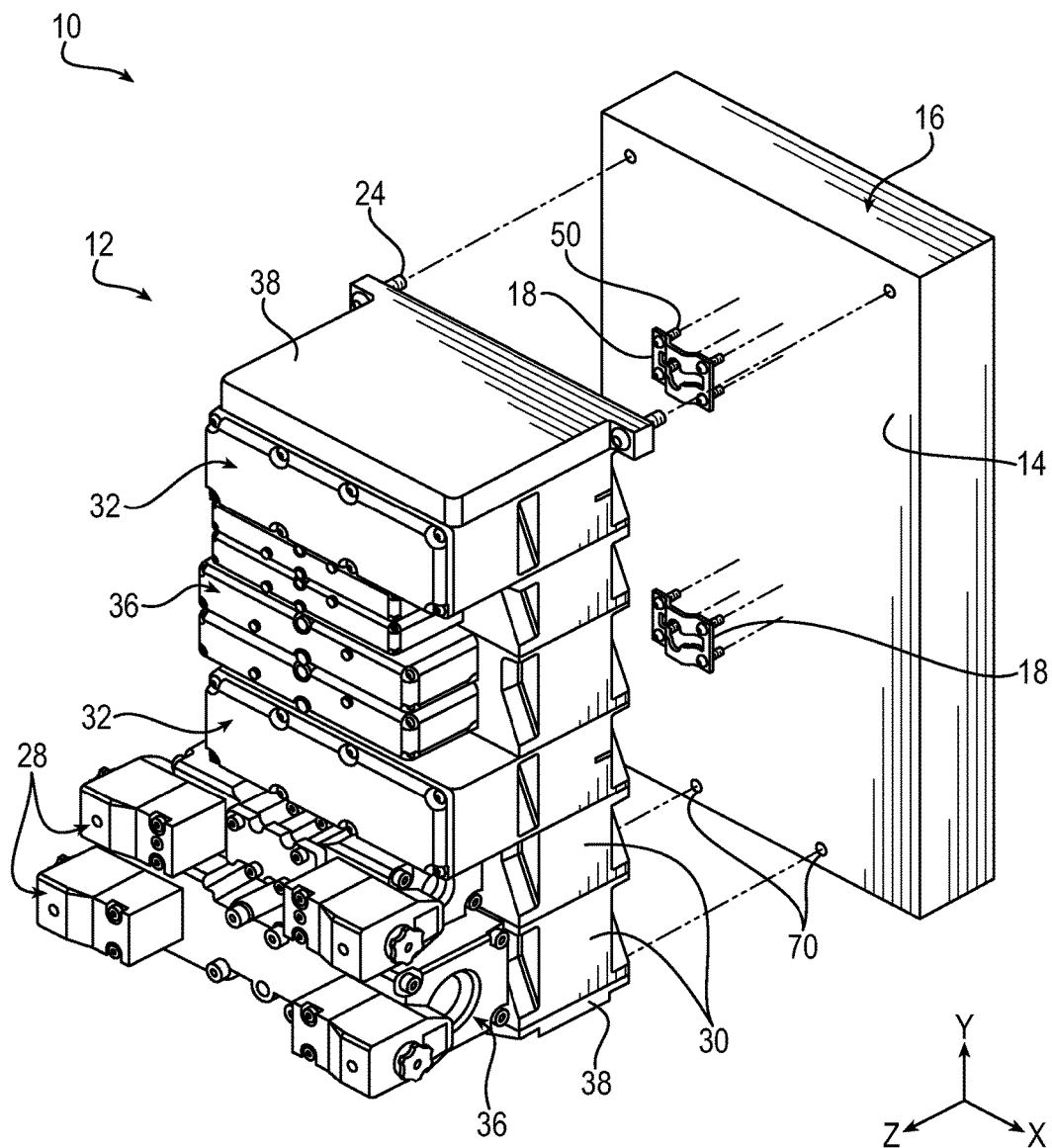
FIG. 1 is a perspective front view of an exemplary hanger system for mounting an exemplary valve bank in an exemplary vertical orientation against a vertical mounting face.

The principles of the present invention have particular application to the mounting of pneumatic valve banks, such as for use in automation control in a factory, and thus will be described below chiefly in this context. It is understood, however, that the principles and aspects of the present invention may be applicable to other valve banks for other applications where it is desirable to provide a system for temporarily hanging the valve bank in multiple different orientations against a vertical mounting face for facilitating fixedly mounting the valve bank to the mounting face, such as with hydraulic or other valve banks that may be utilized in assembly plants, on machines, vehicles, or the like.

Referring to FIGS. 1-11, an exemplary hanger system 10 for temporarily hanging a valve bank on a vertically oriented mounting face 14 of a substrate 16 is shown. Generally, the hanger system 10 includes one or more hanger brackets 18 for attaching to the mounting face, and an exemplary valve bank 12 configured to hang from the hanger brackets 18. In exemplary embodiments, the valve bank 12 has one or more mounting studs 20 protruding from an underside surface 22 of the valve bank, in which the mounting studs 20 are configured to couple with the corresponding hanger brackets 18 for temporarily hanging the valve bank 12 on the mounting face 14 with the underside surface 22 facing toward the mounting face 14. Such temporary mounting of the valve bank 12 on the mounting face 14 allows the valve bank to be suspended without external assistance, thereafter enabling the valve bank 12 to be fixedly mounted to mounting face 14 in a more permanent manner for operational use.

The substrate 16 can be any suitable substrate, such as a tooling plate, cabinet, frame of a workstation, housing of a machine, or the like. It is therefore understood that at least a portion of the substrate 10 may have the mounting face 14 in a vertical plane that extends in a first direction that intersects with the ground (e.g., Y-direction) and that extends in a second direction parallel to ground (e.g., X-direction). It is understood that although the substrate 16 and mounting face 14 are shown as being oriented perpendicular to the ground, the mounting face also can be vertically oriented by being disposed in a plane that is inclined to a plane that is perpendicular to ground.

As discussed in further detail below, the mounting studs 20 and hanger brackets 18 are configured to cooperate with each other to allow the valve bank 12 to be secured in multiple different orientations against the vertical mounting face 14 prior to the valve bank 12 being fixedly mounted to the mounting face 14. In exemplary embodiments, such fixed mounting may utilize one or more fasteners 24 that are received through corresponding fastening receivers in the valve bank 12. In this manner, the mounting stud 20 and the hanger bracket 18 cooperate to suspend the valve bank 12 on the vertical mounting face 14 in the multiple different orientations without external assistance, thereby facilitating fixedly mounting the valve bank 12 to the mounting face 14 with the fasteners 24 in a more permanent manner.

For example, as shown in FIGS. 1, 2, 6 and 7, the exemplary hanger system 10 allows the valve bank 12 to be secured to the vertical mounting face 14 with a long side of the valve bank 12 pointing in the vertical direction (e.g., transverse to ground, as designated by the directional arrow Y in the figures, for example). More particularly, in exemplary embodiments, the valve bank 12 may be elongated such that the valve bank extends along a length (L) in a first direction (e.g., the Y-direction) by a greater distance than it extends along a width (W) in a second direction (e.g., the X-direction), in which the vertical mounting orientation of the valve bank 12 against the mounting face 14 has its length (L) pointing in the vertical direction toward ground.

In the illustrated embodiment, the valve bank 12 is a pneumatic valve bank that utilizes compressed air as a working fluid for controlling one or more actuators or other movable members on a machine (not shown), such as an automation machine in an assembly plant, for example. As shown, the valve bank 12 includes a plurality of valve sections 28, in which each valve section 28 has a valve base 30. The valve bases 30 together form an air manifold that enables air to be supplied to each valve section 28 in a known manner. In exemplary embodiments, at least one of the valve sections includes an air supply module 32 having an inlet port 34 (FIG. 7) for supplying air from a source, such as an air compressor, to the valve bank 12. In addition, at least one of the valve sections includes a pneumatic control valve 36, which may have a valve spool or other control member that moves within a valve body to permit, restrict and/or control the flow of the working fluid through different fluid passages in the valve body to control the movable member of the machine in a known manner. As shown, the valve bank 12 further includes end caps 38 on opposite ends of the manifold that are configured to contain the air in the manifold. It is understood that although the exemplary valve bank 12 has a plurality of valve sections, other such valve banks may have greater or fewer valve sections, such as one or more valve sections. It is also understood that although the exemplary valve bank 12 is a pneumatic valve bank, other types of valve banks may be utilized, such as hydraulic valve banks or the like.

Figure 2:
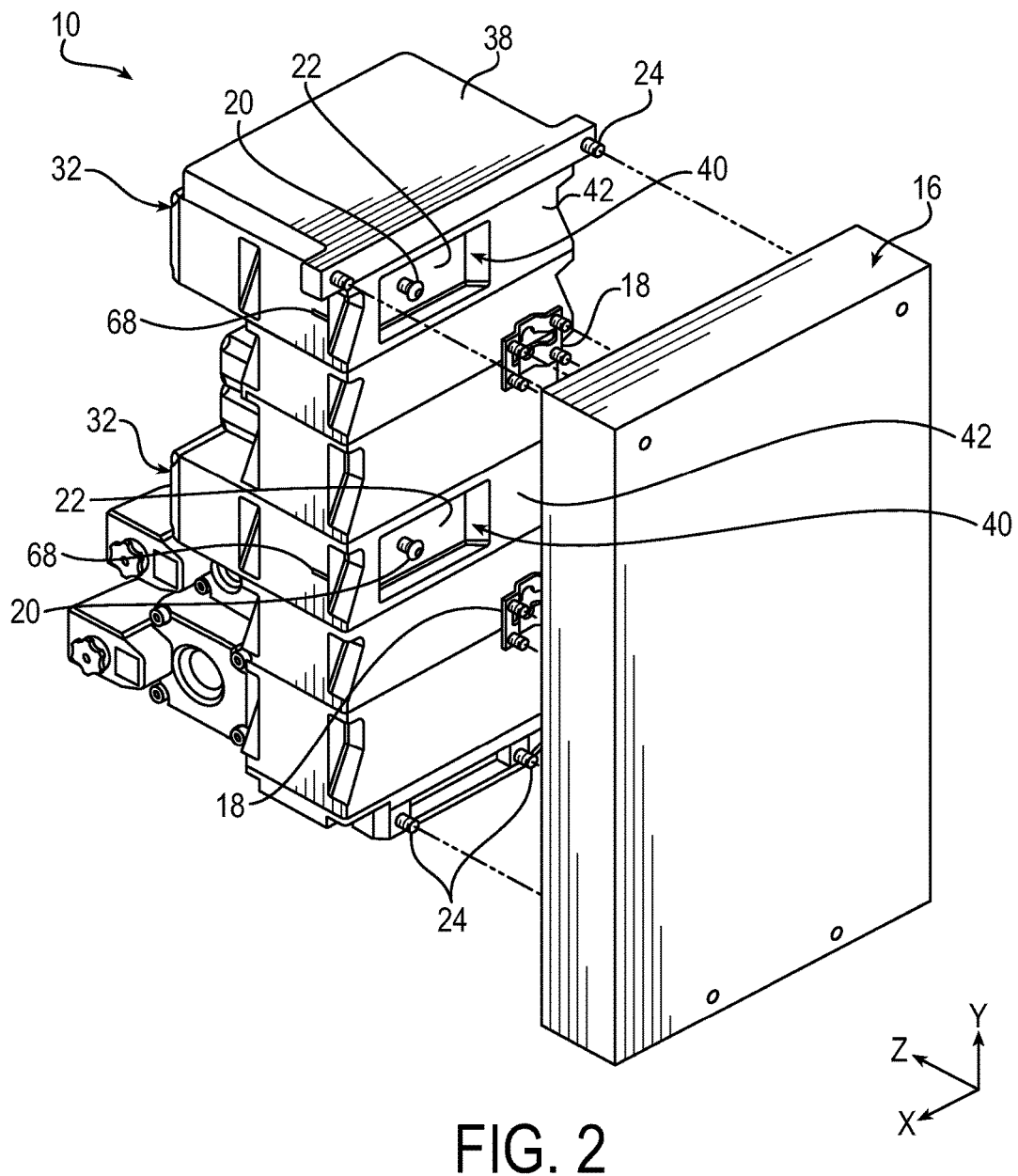
FIG. 2 is a perspective rear view of the hanger system.

Referring particularly to FIG. 2, the mounting stud 20 is shown as being disposed in a recessed area 40 on an underside of the valve bank 12. As shown, the underside surface 22 having the mounting stud 20 is recessed from a major outer surface 42 on the underside of the valve bank that is configured to be adjacent to the mounting face 14. In this manner, the recessed underside surface 22 is spaced apart from mounting face 14 when the valve bank 12 is secured thereto. This allows the hanger bracket 18, which is attached to the mounting surface 14, to be received within the recessed area 40 of the valve bank, so that the hanger bracket 18 can couple with the mounting stud 20 while allowing the underside major surface 42 to be generally flush with the mounting face 14.

It is understood that although the exemplary valve bank 12 is shown with its underside facing toward the mounting face 14, other orientations are possible, such as mounting of the valve bank 12 with the end plate 38 facing toward the mounting face 14, for example. As such, it is understood that the term "underside" refers to an arbitrary frame of reference of the valve bank 12, which could include any side of the valve bank, in which the "underside" therefore refers to the side of the valve bank that faces or is mounted against the mounting face. It is furthermore understood that although the valve bank 12 is shown mounted in the vertical orientation with two hanger brackets 18 and corresponding mounting studs 20, a greater or fewer amount of such brackets and studs may be employed. For example, when mounting in the vertical orientation as shown, only one hanger bracket 18 and mounting stud 20 may be employed to suspend the valve bank 12 on the mounting face 14 without external assistance. It is understood, however, that other mounting orientations on the mounting face 14 are possible, which may utilize a greater number of hanger brackets 18, such as two or more brackets, as discussed in further detail below with reference to FIGS. 8-11.

In exemplary embodiments, the recessed areas 40 on the underside of the valve bank 12 are on the underside of the air supply modules 32. Because the recessed areas 40 extend inwardly into the valve bases 30 that form the manifold, the internal area within that portion of the manifold may be minimized, which may interrupt air flow through the manifold. However, the air supply modules 32 may have fewer internal components than other sections of the valve bank, and thus forming the recessed areas 40 on the air supply modules 32 may minimize flow interruptions through the manifold as air is being supplied to the control valve(s) 36. Such considerations are also applicable to hydraulic valve banks, in which the recessed areas may be formed on hydraulic fluid inlet (supply) sections or the like. Also as shown in the illustrated embodiment, the end plates 38 each has at least one fastening receiver, such as a through-hole in a flange portion of the end plate, which is configured for fixedly mounting the valve bank 12 to the mounting face 14 with the fastener 24.

Referring particularly to FIGS. 3-5, the exemplary hanger bracket 18 and its cooperation with the mounting stud 20 is shown in further detail. As shown, the hanger bracket 18 has a base portion 44 configured to be secured to the mounting face 14, and a raised portion 46 that is raised relative to the base portion 44 to form a gap between the raised portion 46 and the mounting face 14 when the hanger bracket 18 is secured to the mounting face 14. The base portion 44 of the hanger bracket has one or more fastening receivers 48 for receiving one or more fasteners 50, such as a screw or bolt (best shown in FIG. 8), for securing the hanger bracket 18 to the mounting face 14 prior to the hanger bracket 18 being coupled with the mounting stud 20.

In the illustrated embodiment, the base portion 44 is a first base portion at one end of the hanger bracket 18, and the hanger bracket 18 has a second base portion 45 at an opposite end of the hanger bracket, in which the raised portion 46 is interposed between the first and second base portions. The raised portion 44 is connected to the first and second base portions 44, 45 with respective inclined surfaces 52, 53, which are inclined to a plane perpendicular a plane that contains the base portions 44, 45. In exemplary embodiments, a thickness (T) of the hanger bracket 18 (as measured from a bottom of the base portions 44, 45 to a top of the raised portion 46) is not greater than a depth of the recessed area 40 (as measured from the recessed underside surface 22 having the mounting stud to the outer underside major surface 42 that is configured to be adjacent to the mounting face 14 when the valve bank 12 is secured to the mounting face). This allows the valve bank 12 to be more flush with the mounting face 14 for facilitating the fixed attachment with the fasteners 24. The hanger bracket 18 may be a metal stamped component, or may be made from other suitable methods, such as powder metallurgy, casting or additive manufacturing.

As shown in FIG. 5, with further reference to FIGS. 1-4, the hanger bracket 18 has a slot 56 that is configured to receive the mounting stud 20 for coupling of the hanger bracket 18 and the mounting stud 20. In exemplary embodiments, the mounting stud 20 has an enlarged portion 58 toward its axial end that is configured to be spaced apart from the recessed underside surface 22 of the valve bank (as shown in FIG. 2, for example). The slot 56 of the hanger bracket 18 is configured to receive the enlarged portion 58 of the mounting stud 20 such that an underside portion 60 of the hanger bracket 18 grips an underside of the enlarged portion 58 of the mounting stud 20 to thereby couple the hanger bracket 18 with the mounting stud 20 in an interlocking manner so that the valve bank 12 can be suspended on the mounting face 14.

Figure 10:
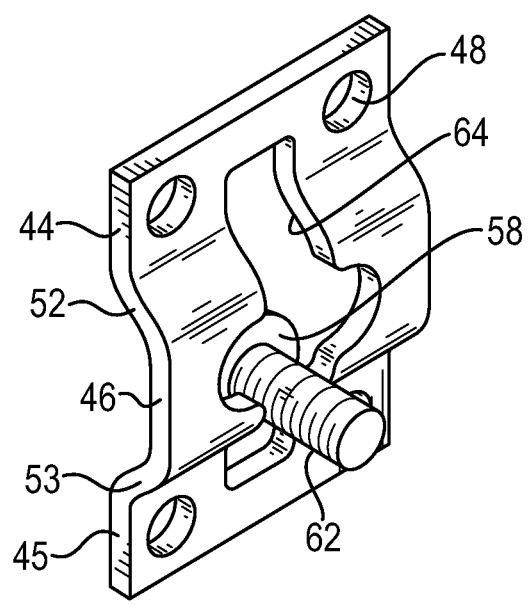
FIG. 10 is a perspective view of the exemplary mounting stud of the valve bank that is shown coupling with the hanger bracket when the valve bank is mounted in the exemplary horizontal orientation.

In exemplary embodiments, the mounting stud 20 has a narrow portion 62 adjacent to the enlarged portion 58, in which the narrow portion 62 is interposed between the enlarged portion 58 and the underside surface 22 of the valve bank (as shown in FIG. 2, for example). As shown, the slot 56 of the hanger bracket 18 may be an elongated throughslot having one or more narrow portions 64 and one or more lateral cutout portions 66, which together form a crossshaped slot in the illustrated embodiment. The lateral cutout portion 66 may be configured to receive the enlarged portion 58 of the mounting stud 20 through the slot 56, and the narrow portion 64 of the slot 56 may be configured to allow the narrow portion 62 of the mounting stud 20 to slidably move within the narrow portion of the slot (as shown in FIG. 10, for example). In this manner, when the narrow portion 62 of the mounting stud 20 is within the narrow portion 60 of the slot 56, the enlarged portion 58 of the mounting stud 20 engages against the underside 60 of the hanger bracket 18 to interlockingly couple the hanger bracket and mounting stud together. It is understood that such a configuration of the slot 56 is exemplary and other configurations are possible such that the enlarged portion 58 of the mounting stud engages the underside of the hanger bracket 18 via the slot 56.

In exemplary embodiments, the mounting stud 20 is configured to protrude from the recessed underside surface 22 of the valve bank by a distance that enables the hanger bracket 18 to grip the enlarged portion 58 of the mounting stud 20 without the mounting stud interfering with the mounting face 14 when the valve bank 12 is suspended from the hanger bracket 18 attached to the mounting face 14. In the illustrated embodiment, the mounting stud 20 is a threaded fastener, such as a bolt, that is threaded into the recessed underside surface 22 of the valve bank. The threaded fastener has an enlarged head at an axial end thereof that serves as the enlarged portion 58, and the threaded portion serves as the narrow portion 62 of the mounting stud. The threaded fastener may be threaded into the underside surface 22 of the valve bank 12 such that the fastener is configured to bottom out to set the distance by which the enlarged portion 58 protrudes from the underside surface 22. It is understood that although the mounting stud 20 is shown as being discrete with respect to the valve bank 12, the mounting stud could also be integral and/or unitary with the valve bank.

Also as shown in the illustrated embodiment, the valve bank 12 may have markings 68, such as first and second markings on at least one side of the valve bank, that indicate the location of the corresponding first and second mounting studs 20. This allows the installer to use the markings 68 to easily measure the distance between the mounting studs 20, in which this measurement is then used to attach the hanger brackets 18 to the mounting face 14 in spaced apart relation according to the measured distance.

Figure 6:
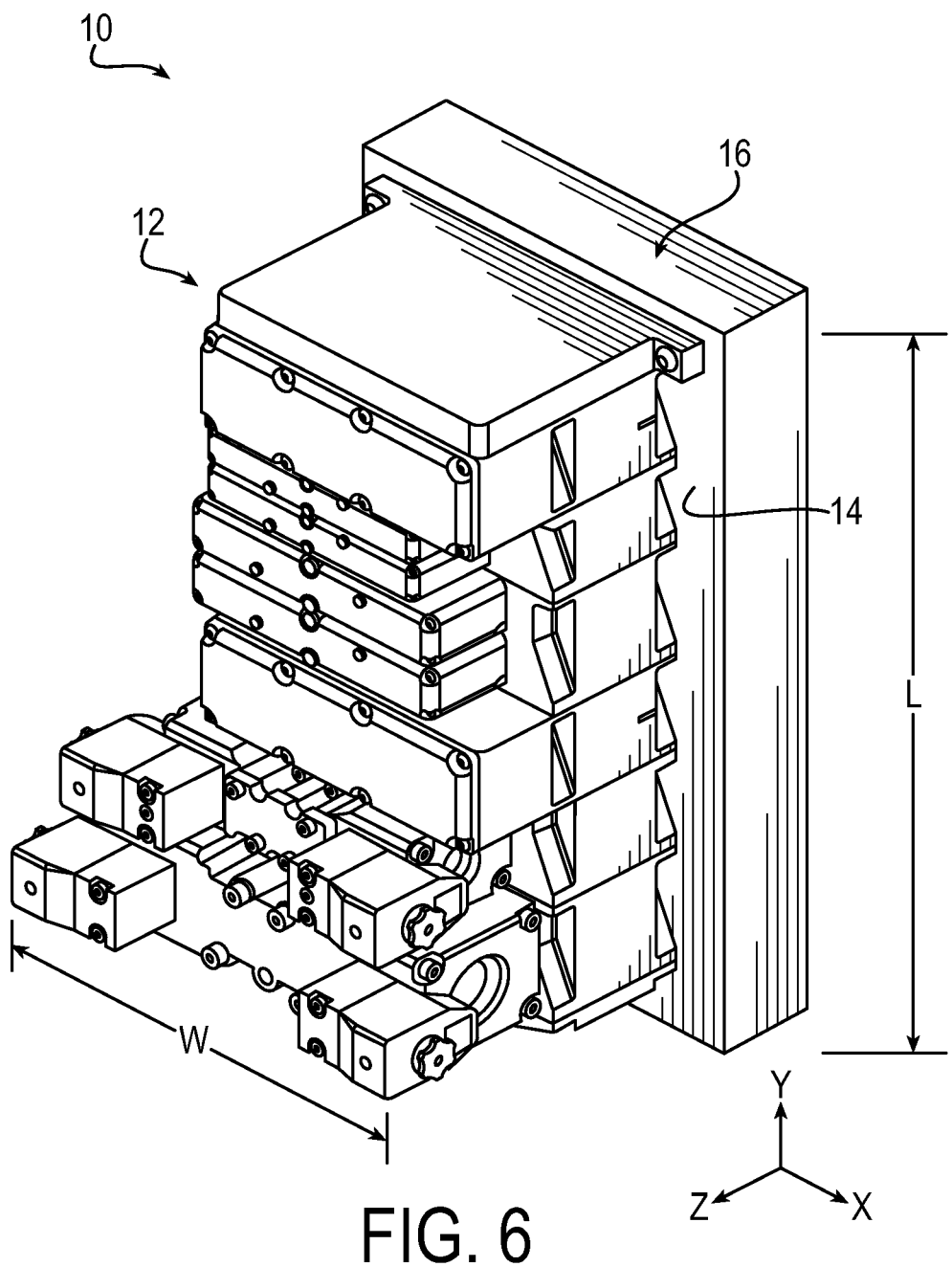
FIG. 6 is a perspective front view of the valve bank in FIG. 1 fixedly mounted in the exemplary vertical orientation against the vertical mounting face.
Figure 7:
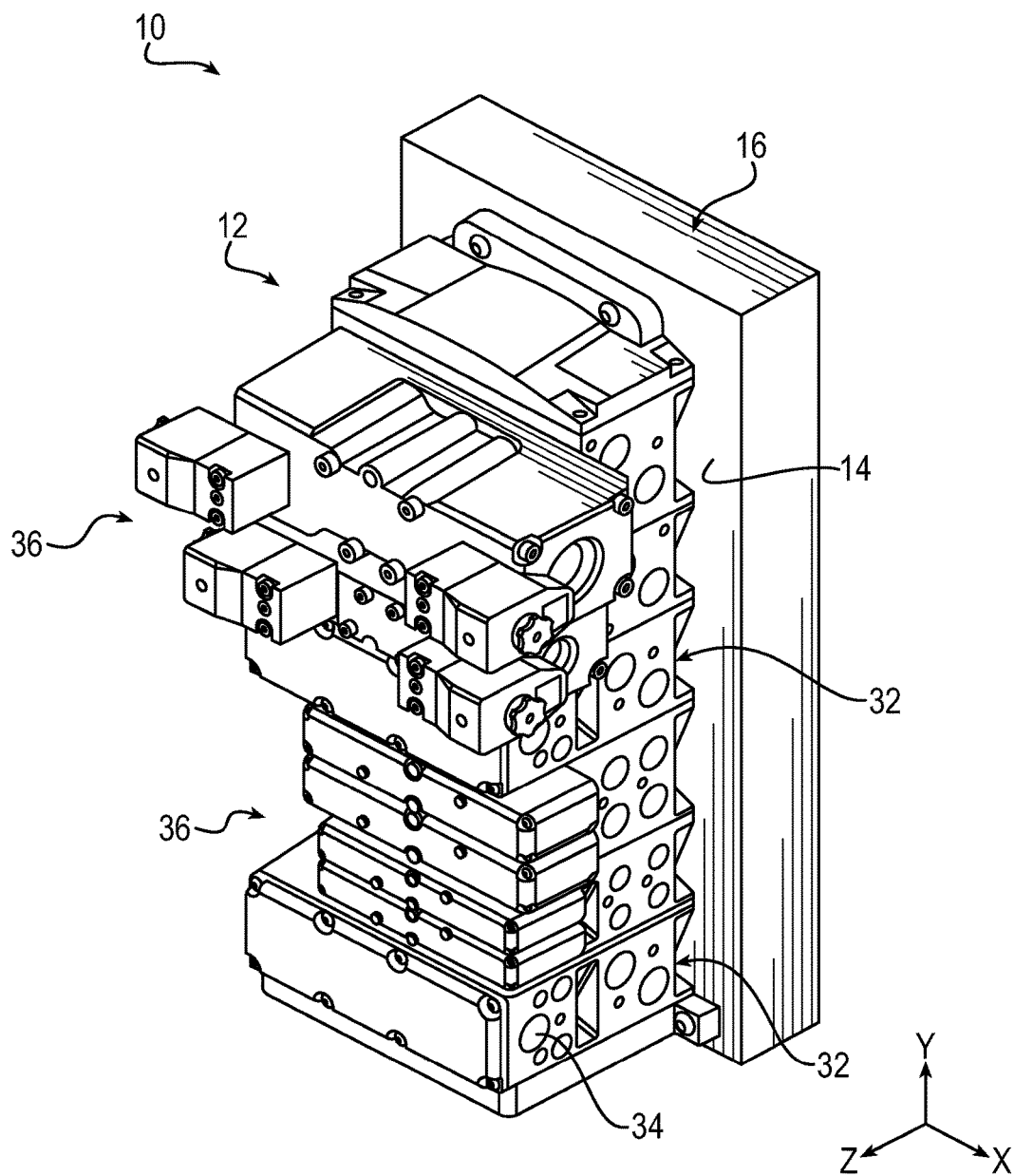
FIG. 7 is a perspective view of another exemplary vertical orientation for mounting the valve bank in FIG. 1 to the vertical mounting face.

In an exemplary operation, the hanger brackets 18 are first mounted to the mounting face 14 with the fasteners 50. When the exemplary valve bank 12 is mounted in the vertical orientation (FIG. 1), the hanger brackets 18 are aligned in the vertical direction (e.g., Y-direction) to align with the vertical orientation of the mounting studs 20; however, if the mounting studs 20 were aligned along the width of the valve bank 12, then the brackets also would be mounted next to each other in this direction (e.g., X-direction) to hang the valve bank vertically. Next, the valve bank 12 is mounted onto the hanger brackets 18 with the mounting studs 20 in the manner described above. The markings 68 may assist the installer in aligning the mounting studs 20 with the hanger brackets 18 when hanging the valve bank on the mounting face 14. As discussed above, the hanger brackets 18 and mounting studs 20 cooperate to suspend the valve bank 12 on the vertical mounting face 14 without external assistance, thereby more easily enabling the installer to drill holes 70 through the mounting face 14 that correspond with the location of the fastening receivers in the valve bank 12. The installer may then install the fasteners 24 through the fastening receivers and holes 70 to fixedly attach the valve bank 12 to the mounting face 14 in a more permanent manner (as shown in FIG. 6, for example). As shown in FIG. 7, such an installation method also may allow the installer to mount the valve bank 12 in the opposite vertical direction (180-degrees relative to the orientation in FIG. 6), for example.

In exemplary embodiments, the hanger brackets 18 may be attached to the mounting face 14 in a particular orientation depending on the desired orientation of the valve bank 12 on the mounting face 14. For example, as shown in FIGS. 1-6, when the desired orientation of the valve bank 12 is with its length (L) in the vertical direction (e.g., Y-direction), then the hanger brackets 18 may be oriented with their long side pointing parallel to ground (e.g., X-direction). In the illustrated embodiment, each of the recessed areas 40 is elongated with a length greater than its width, such that the length of the recessed area 40 extends in the direction of the width (W) of the valve bank 12. As such, because the hanger bracket 18 is also elongated and is configured to be received within the recessed area 40, the longer side of the hanger bracket 18 may be oriented in the same direction as the length of the recessed area 40. In such a configuration, when the mounting stud 20 couples with the hanger bracket 18, the mounting stud 20 will be disposed in one of the cutout portions 66 of the slot (as shown in FIG. 5, for example). In this manner, the enlarged portion 58 of the mounting stud 20 grips an underside of the hanger bracket 18 at the portion corresponding with the cutout portion 66. It is understood that such configuration is preferred and exemplary, and other orientations of the recessed areas 40 and/or hanger brackets 18 are possible as understood by those having ordinary skill in the art.

Figure 8:
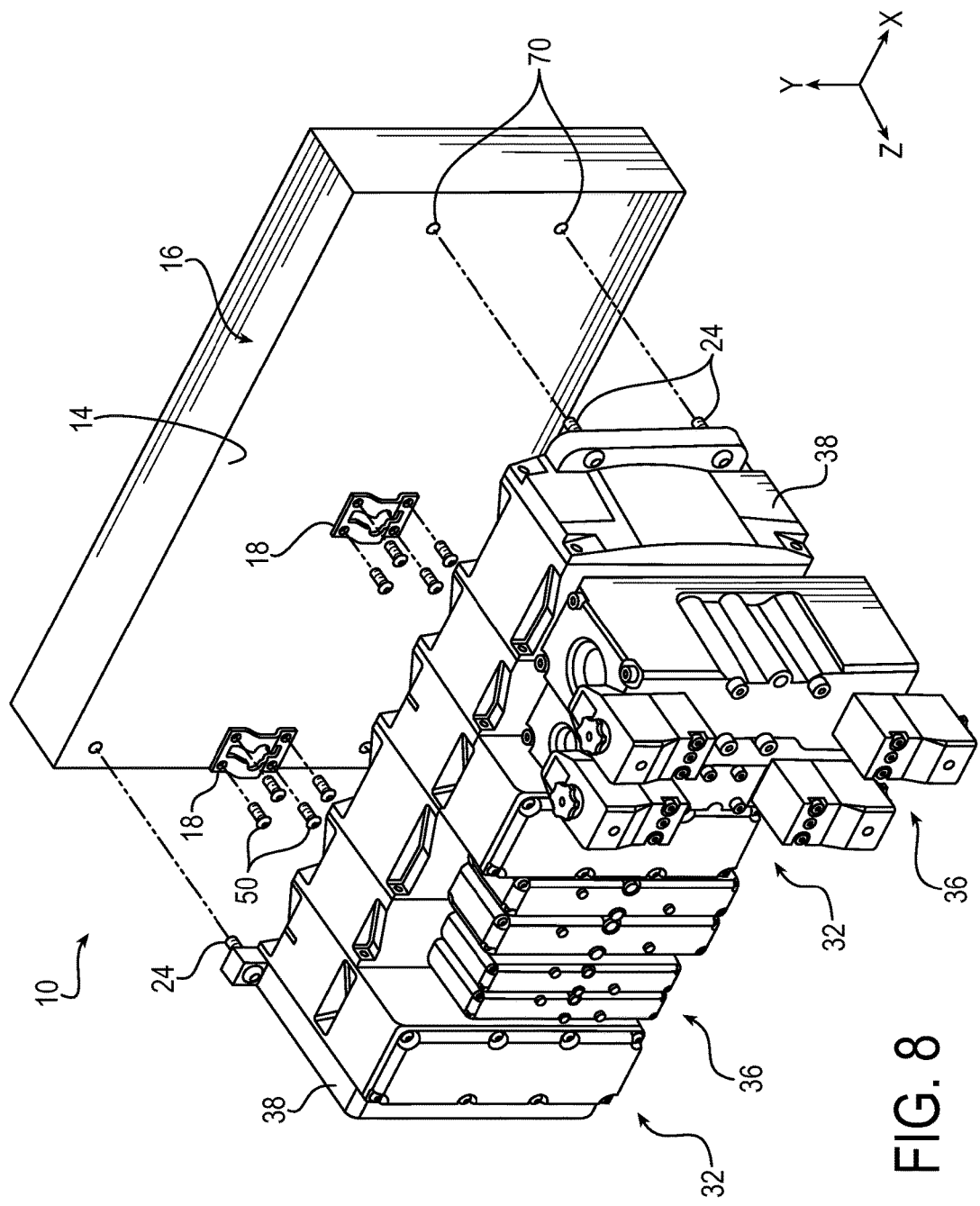
FIG. 8 is a perspective front view of the exemplary hanger system in FIG. 1 that is shown mounting the exemplary valve bank in an exemplary horizontal orientation against a vertical mounting face.
Figure 9:
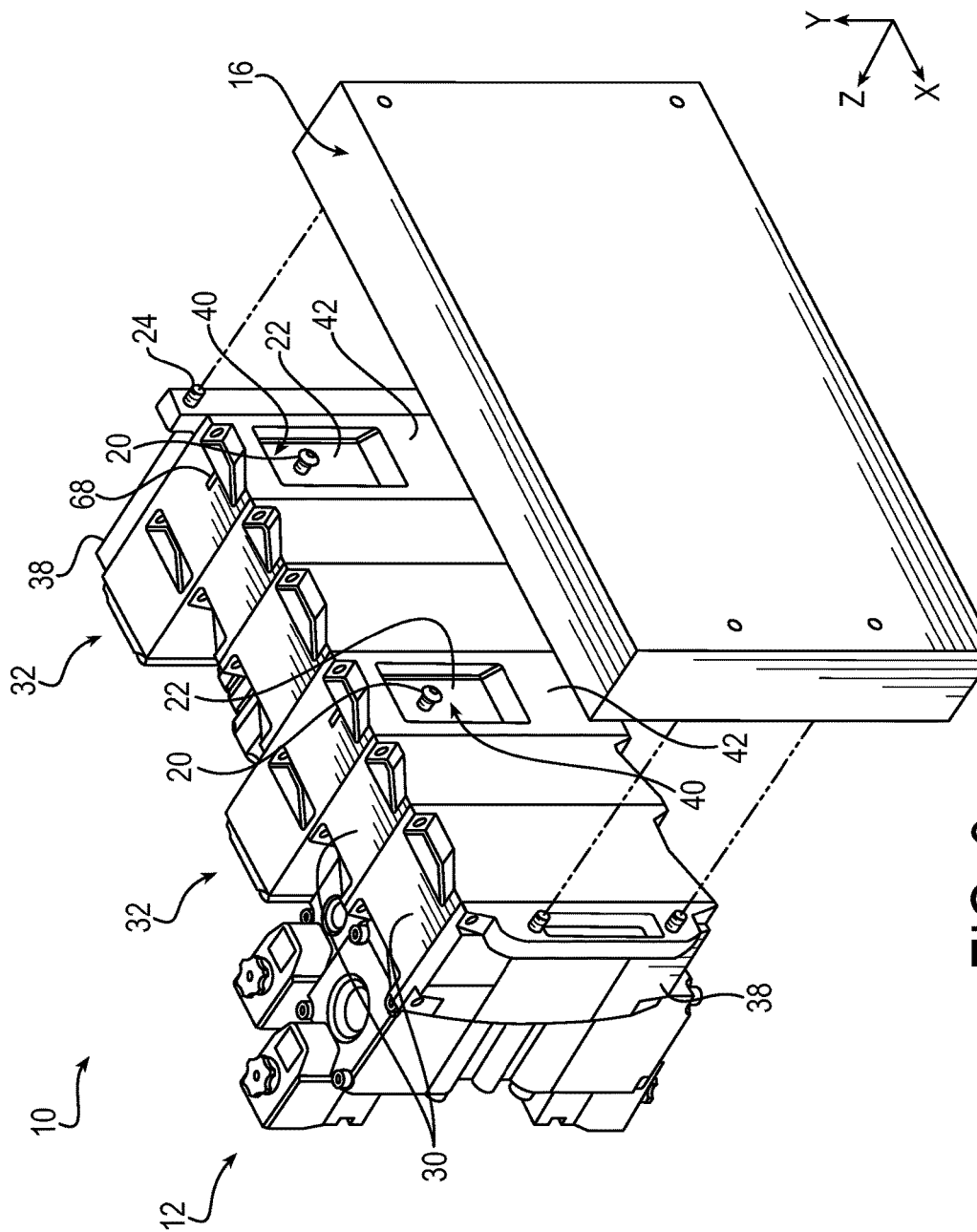
FIG. 9 is a perspective rear view of the horizontal orientation shown in FIG. 8.

As discussed above, the mounting studs 20 and hanger brackets 18 are configured to cooperate with each other to allow the valve bank 12 to be temporarily secured in multiple different orientations against the mounting face 14 prior to the valve bank 12 being fixedly mounted to the mounting face 14. In this manner, the exemplary hanger system 10 may be utilized to mount the valve bank 12 essentially regardless of its orientation on the vertical mounting face 14. For example, the hanger brackets 18 and mounting studs 20 may be utilized to mount the valve bank 12 to the mounting face 14 with the long side (L) of the valve bank pointing in the vertical direction (e.g., Y-direction), as discussed above with reference to FIGS. 1-7; or the valve bank 12 may be mounted to the mounting face 14 with its long side (L) running parallel to ground (e.g., X-direction), as shown in FIG. 8. It is understood that although two configurations are shown in the illustrated embodiments, the exemplary hanger system 10 also may allow the valve bank 12 to be oriented in any position against the vertical mounting face 14 between these two positions.

Referring to FIGS. 8-11, the exemplary hanger system 10 is shown mounting the valve bank 12 in an exemplary horizontal position against the vertical mounting face 14, such that the long side (L) of the valve bank 12 is oriented parallel to the horizontal ground. The same components used in mounting the valve bank 12 in the vertical orientation (e.g., FIGS. 1-7) are also used in the horizontal configuration, and thus the description above related to the vertical orientation also applies to the horizontal orientation, except as noted below.

Figure 11:
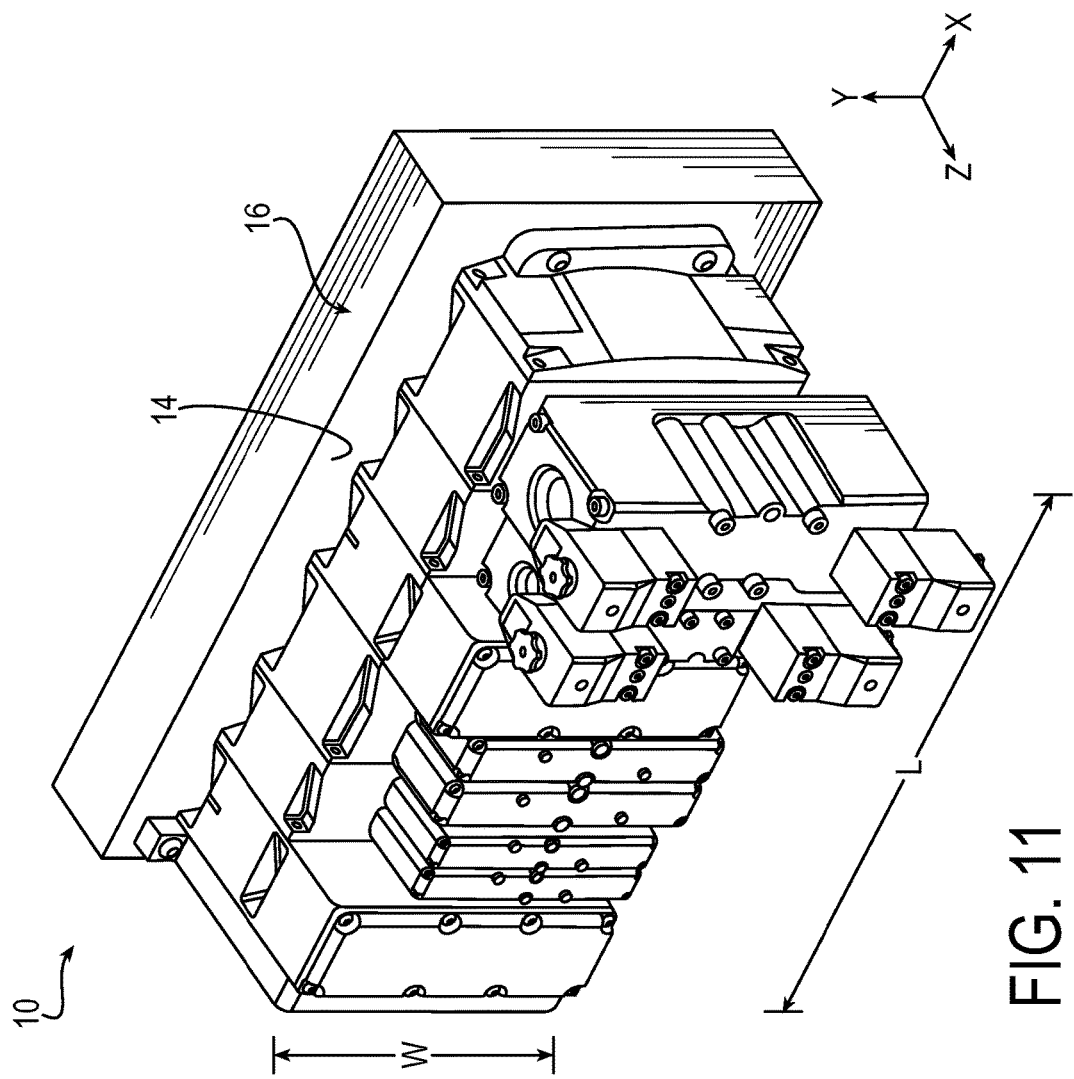
FIG. 11 is a perspective front view of the valve bank in FIG. 8 fixedly mounted in the exemplary horizontal orientation against the vertical mounting face.

As shown, when mounting the exemplary valve bank 12 in the horizontal orientation (FIG. 8), the hanger brackets 18 are attached to the mounting face 14 spaced apart from each other in the horizontal direction, which is generally parallel to ground (e.g., X-direction), so that the hanger brackets 18 align with the mounting studs 20. In this configuration, two hanger brackets 18 are utilized in spaced apart relation to secure the valve bank 12 in position and restrict pivoting of the valve bank 12 due to gravity. Similarly to the description above, the valve bank 12 is then mounted onto the hanger brackets 18 with the mounting studs 20. The markings 68 may assist the installer in aligning the mounting studs 20 with the brackets 18 when hanging the valve bank 12 on the mounting face 14. The installer then installs the fasteners 24 through the fastening receivers in the valve bank 12 to fixedly attach the valve bank 12 to the mounting face 14 in a more permanent manner (as shown in FIG. 11, for example). Such an installation method also may allow the installer to mount the valve bank 12 in the opposite horizontal direction (180-degrees relative to the orientation in FIG. 11), for example.

As shown in FIG. 8, when the desired orientation of the valve bank 12 is with its length (L) parallel to ground (e.g., X-direction), then the hanger brackets 18 may be oriented with their long side pointing toward ground (e.g., Y-direction). Similarly to the description above, because the length of the recessed area 40 extends in the direction of the width (W) of the valve bank (e.g., in the Y-direction in this configuration), then the length of the hanger bracket 18 may be oriented in the same direction as the length of the recessed area 40. In such a configuration, when the mounting stud 20 couples with the hanger bracket 18 in the manner described above, the mounting stud 20 will be disposed in one of the narrow portions 64 of the slot 56 (as shown in FIG. 10, for example). More particularly, because the undersides of the base portions 44, 45 of the hanger bracket 18 are attached adjacent to the mounting face 14, the enlarged portion 58 of the mounting stud 20 will not move beyond the inclined portions 52, 53 of the hanger bracket 18 due to interference with the mounting face 14, and thus the mounting stud 20 will be positioned in the slot 56 as shown in FIG. 10. It is understood that such configuration is preferred and exemplary, and that other orientations of the recessed areas and/or brackets are possible as understood by those having ordinary skill in the art.

While a preferred form of the exemplary hanger system, valve bank and/or hanger bracket(s) has been described above, it should be apparent to those skilled in the art that other valve bank and/or hanger bracket designs could also be used with the present invention. The invention is not limited to any particular valve bank and/or hanger bracket design, but rather is appropriate for a wide variety of such components.

A hanger system for temporarily hanging a valve bank on a vertical mounting face of a substrate has been described herein. The hanger system includes one or more hanger brackets for attaching to the vertical mounting face. The valve bank has one or more mounting studs protruding from an underside surface of the valve bank, in which the mounting studs are configured to couple with the hanger brackets for temporarily hanging the valve bank on the mounting face with the underside surface facing toward the mounting face. The mounting studs and hanger brackets are configured to cooperate with each other to allow the valve bank to be secured in multiple different orientations against the mounting face, thereby facilitating fixedly mounting the valve bank to the mounting face with one or more fasteners that are received through corresponding fastening receivers in the valve bank.

Generally, with the use of two or more such hanger brackets the valve bank can be supported during installation either in the horizontal or vertical plane. The hanger system provides a temporary supporting feature when the valve bank is being affixed to a substrate, such as an equipment support on factory automation equipment, which thereby assists with the permanent assembly of the valve bank to the equipment support. The hanger brackets would be fastened onto the equipment substrate. In exemplary embodiments, there are four bolts which would mount the hanger bracket to the equipment support. There is a protrusion, such as a mounting stud, pin or the like, that extends from the bottom of the valve bank. The protrusion will slide into the bracket to support the valve bank temporarily during assembly.

The bracket and method disclosed herein provide an installer the ability to temporarily support the valve bank (pneumatic or hydraulic) in multiple orientations until it can be affixed properly. Currently, valve banks today can be temporarily supported as an installation aid only in the horizontal direction with a DIN rail. The bracket and method disclosed herein allows the valve bank to be supported either horizontally or vertically, or any position therebetween.

In exemplary embodiments, the slot in the bracket is a cross-shaped form having two slot portions transverse to each other. In exemplary embodiments, depending on which slot portion is used determines whether the valve bank is supported vertically or horizontally. For example, one slot portion may preferentially be used if the valve bank is to be mounted horizontally and the other slot portion may be used if the valve bank is to be mounted vertically.

The protrusion that is captured in the bracket contacts the underside face of the bracket to support the valve bank. The protrusion includes a feature that will enable it to slide into the slot easily, and also has a feature that is larger than the slot to create the proper contact and prevent the protrusion from leaving the bracket.

According to an aspect of the present disclosure, a bracket for temporarily supporting a valve bank includes a planar mounting surface and a mounting portion that is raised relative to the planar mounting surface, the mounting portion including a cross-shape keyhole slot that engages a protrusion to temporarily hold the valve in position in a vertical or horizontal position.

According to another aspect of the present disclosure, an assembly includes a valve bank having at least one valve, the valve bank having at least one projection extending from a surface of the valve bank, and a bracket for temporarily supporting a valve bank comprising a planar mounting surface and a mounting portion that is raised relative to the planar mounting surface, the mounting portion including a cross-shape keyhole slot that engages a protrusion to temporarily hold the valve in position in a vertical or horizontal position.

In some embodiments, the valve bank is temporarily supported by the projection and mounting bracket while the valve bank is coupled to a block on a machine. In some embodiments, the block on the machine is coupled to a DIN rail.

According to an aspect of the invention, a hanger system for temporarily hanging a valve bank on a substrate having a mounting face that is oriented vertically relative to ground, includes: a hanger bracket for attaching to the mounting face; and a valve bank having a mounting stud protruding from an underside surface of the valve bank, the mounting stud being configured to couple with the hanger bracket for temporarily hanging the valve bank on the mounting face with the underside surface facing toward the mounting face, and the valve bank having a fastening receiver for receiving a fastener that fixedly mounts the valve bank to the mounting face; wherein the mounting stud and the hanger bracket are configured to cooperate with each other to allow the valve bank to be secured in multiple different orientations against the mounting face prior to being fixedly mounted with the fastener; and wherein the mounting stud and the hanger bracket are configured to cooperate with each other to suspend the valve bank on the mounting face, thereby facilitating fixedly mounting the valve bank to the mounting face with the fastener via the fastening receiver.

According to another aspect of the invention, a hanger system for temporarily hanging a pneumatic valve bank on a substrate having a mounting face that is oriented vertically relative to ground, includes: a hanger bracket for attaching to the mounting face; and a pneumatic valve bank including a plurality of valve sections, in which at least one valve section is a pneumatic control valve and at least one valve section is an air supply module, the valve bank having a mounting stud protruding from an underside surface of the valve bank, the mounting stud being configured to couple with the hanger bracket for temporarily hanging the valve bank on the mounting face with the underside surface facing toward the mounting face, and the valve bank having a fastening receiver for receiving a fastener that fixedly mounts the valve bank to the mounting face; wherein the mounting stud and the hanger bracket are configured to cooperate with each other to allow the valve bank to be secured in multiple different orientations against the mounting face prior to being fixedly mounted with the fastener, and are configured to cooperate with each other to suspend the valve bank on the mounting face, thereby facilitating fixedly mounting the valve bank to the mounting face with the fastener via the fastening receiver; wherein the mounting stud is disposed in a recessed area on an underside of the valve bank, and the hanger bracket is configured to be received within the recessed area to couple with the mounting stud; and wherein the recessed portion on the underside of the valve bank is on the underside of the air supply module.

According to another aspect of the invention, a method of fixedly mounting a valve bank to a mounting face of a substrate that is oriented vertically relative to ground, includes: (i) attaching two discrete hanger brackets to the mounting face; (ii) hanging a valve bank on the hanger brackets with two discrete mounting studs that protrude from an underside surface of the valve bank, such that each of the hanger brackets grips a corresponding one of the mounting studs; and (iii) fixedly mounting the valve bank to the mounting face with fasteners that are received by fastening receivers on the valve bank.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hanger system for temporarily hanging a valve bank on a substrate having a mounting face that is oriented vertically relative to ground, the hanger system comprising:
a hanger bracket for attaching to the mounting face; and
a valve bank having a mounting stud protruding from an underside surface of the valve bank, the mounting stud being configured to couple with the hanger bracket for temporarily hanging the valve bank on the mounting face with the underside surface facing toward the mounting face, and the valve bank having a fastening receiver for receiving a fastener that fixedly mounts the valve bank to the mounting face;
wherein the mounting stud and the hanger bracket are configured to cooperate with each other to allow the valve bank to be secured in multiple different orientations against the mounting face prior to being fixedly mounted with the fastener; and
wherein the mounting stud and the hanger bracket are configured to cooperate with each other to suspend the valve bank on the mounting face, thereby facilitating fixedly mounting the valve bank to the mounting face with the fastener via the fastening receiver.

2. The hanger system according to claim 1, wherein the mounting stud is disposed in a recessed area on an underside of the valve bank; and
wherein the hanger bracket is configured to be received within the recessed area to couple with the mounting stud.

3. The hanger system according to claim 2, wherein the hanger bracket has a base portion configured to be secured to the mounting face, and a raised portion that is raised relative to the base portion to form a gap between the raised portion and the mounting face when the hanger bracket is secured to the mounting face.

4. The hanger system according to claim 3, wherein a thickness of the hanger bracket measured from a bottom of the base portion to a top of the raised portion is not greater than a depth of the recessed area measured from the underside surface having the mounting stud to an outer underside surface of the valve bank that is configured to be adjacent to the mounting face when the valve bank is secured to the mounting face.

5. The hanger system according to claim 3, wherein the base portion of the hanger bracket has a fastening receiver for receiving a fastener for securing the hanger bracket to the mounting face prior to the hanger bracket being coupled with the mounting stud.

6. The hanger system according to claim 5, wherein the base portion is a first base portion at one end of the hanger bracket, the hanger bracket having a second base portion at an opposite end of the hanger bracket, wherein the raised portion is interposed between the first and second base portions, and is connected to the first and second base portions with respective inclined surfaces.

7. The hanger system according to claim 2, wherein the valve bank includes a plurality of valve sections,
in which at least one valve section is a hydraulic control valve; or
in which at least one valve section is a pneumatic control valve.

8. The hanger system according to claim 7, in which the at least one valve section is a pneumatic control valve and at least one other valve section is an air supply module, wherein the recessed portion on the underside of the valve bank is on the underside of the air supply module;
wherein each of the plurality of valve sections has a valve base, the respective valve bases forming an air manifold for transferring air from the air supply module to the pneumatic control valve; and
wherein the valve bank further includes end plates at each end of the air manifold for containing air therein, the end plates each having at least one of the fastening receiver for fixedly mounting the valve bank to the mounting face with corresponding ones of the fasteners.

9. The hanger system according to claim 1, wherein the hanger bracket has a slot that is configured to receive the mounting stud for enabling coupling of the hanger bracket and the mounting stud.

10. The hanger system according to claim 9, wherein the mounting stud has an enlarged portion spaced apart from the underside surface of the valve bank; and
wherein the slot of the hanger bracket is configured to receive the enlarged portion of the mounting stud such that a portion of the hanger bracket grips the enlarged portion to couple the hanger bracket with the mounting stud, thereby enabling hanging of the valve bank on the mounting face.

11. The hanger system according to claim 10, wherein the mounting stud has a narrow portion adjacent to the enlarged portion, the narrow portion being interposed between the enlarged portion and the underside surface of the valve bank;
wherein the slot of the hanger bracket is an elongated through-slot having a narrow portion and a lateral cutout portion;
wherein the lateral cutout portion is configured to receive the enlarged portion of the mounting stud through the through-slot; and
wherein the narrow portion of the through-slot is configured to allow the narrow portion of the mounting stud to move within the narrow portion of the slot, such that, when the narrow portion of the mounting stud is within the narrow portion of the slot, the enlarged portion of the mounting stud engages against an underside of the hanger bracket.

12. The hanger system according to claim 1, wherein the mounting stud protrudes from the underside surface of the valve bank by a distance that enables the hanger bracket to grip an end portion of the mounting stud without the mounting stud engaging with the mounting face when the valve bank is suspended from the hanger bracket attached to the mounting face.

13. The hanger system according to claim 1, wherein the mounting stud is a threaded fastener that is threaded into the underside surface of the valve bank, the threaded fastener having an enlarged head at an axial end thereof that is configured to be received into a slot of the hanger bracket, the hanger bracket being configured to grip the enlarged head of the threaded fastener to securely couple the hanger bracket with the mounting stud.

14. The hanger system according to claim 1, wherein the valve bank extends along a length in a first direction, and extends along a width in a second direction, the valve bank being elongated such that the length in the first direction is greater than the width in the second direction;
wherein the mounting stud is disposed in a recessed area on an underside of the valve bank, the recessed area having a length and a width, with the length being elongated relative to the width, the recessed area being oriented with its length extending in the direction of the width of the valve bank along the second direction; and
wherein the hanger bracket has a length and a width, with the length being elongated relative to the width, the hanger bracket being configured to be received within the recessed area of the valve bank such that the length of the hanger bracket is oriented in the same direction as the length of the recessed area.

15. The hanger system according to claim 1, wherein the hanger bracket is a first hanger bracket, and the mounting stud is a first mounting stud, the valve bank having at least one additional mounting stud, and the hanger system having at least one additional hanger bracket for coupling to the at least one additional mounting stud.

16. The hanger system according to claim 15, wherein the first mounting stud is disposed in a first recessed area on an underside of the valve bank, and the second mounting stud is disposed in a second recessed area on the underside of the valve bank, the first and second recessed areas being discrete with respect to each other and spaced apart from each other, in which each of the first and second recessed area is configured to receive the corresponding first and second hanger bracket to couple with the corresponding first and second mounting stud.

17. The hanger system according to claim 16, wherein the valve bank has first and second markings on at least one side of the valve bank that is transverse to the underside, the first and second markings indicating the location of the corresponding first and second mounting studs, thereby facilitating measurement between the mounting studs and facilitating mounting of the valve bank on the first and second hanger brackets.

18. A hanger system for temporarily hanging a pneumatic valve bank on a substrate having a mounting face that is oriented vertically relative to ground, the hanger system comprising:
a hanger bracket for attaching to the mounting face; and
a pneumatic valve bank including a plurality of valve sections, in which at least one valve section is a pneumatic control valve and at least one valve section is an air supply module, the valve bank having a mounting stud protruding from an underside surface of the valve bank, the mounting stud being configured to couple with the hanger bracket for temporarily hanging the valve bank on the mounting face with the underside surface facing toward the mounting face, and the valve bank having a fastening receiver for receiving a fastener that fixedly mounts the valve bank to the mounting face;
wherein the mounting stud and the hanger bracket are configured to cooperate with each other to allow the valve bank to be secured in multiple different orientations against the mounting face prior to being fixedly mounted with the fastener, and are configured to cooperate with each other to suspend the valve bank on the mounting face, thereby facilitating fixedly mounting the valve bank to the mounting face with the fastener via the fastening receiver;
wherein the mounting stud is disposed in a recessed area on an underside of the valve bank, and the hanger bracket is configured to be received within the recessed area to couple with the mounting stud; and
wherein the recessed portion on the underside of the valve bank is on the underside of the air supply module.

* * * * *